(12) United States Patent
Storm et al.

(10) Patent No.: US 8,903,142 B2
(45) Date of Patent: Dec. 2, 2014

(54) BIOMETRIC VERIFICATION DEVICE AND METHOD

(75) Inventors: Henrik Storm, Mölndal (SE); Eric Setterberg, Västra Frölunda (SE)

(73) Assignee: Fingerprint Cards AB, Gothenburg (SE)

( * ) Notice: Subject to any disclaimer, the term of this patent is extended or adjusted under 35 U.S.C. 154(b) by 0 days.

(21) Appl. No.: 13/807,256

(22) PCT Filed: Jul. 12, 2010

(86) PCT No.: PCT/SE2010/050809
§ 371 (c)(1), (2), (4) Date: Dec. 27, 2012

(87) PCT Pub. No.: WO2012/008885
PCT Pub. Date: Jan. 19, 2012

(65) Prior Publication Data
US 2013/0108125 A1   May 2, 2013

(51) Int. Cl.
*G06K 9/00* (2006.01)

(52) U.S. Cl.
CPC ........ *G06K 9/00375* (2013.01); *G06K 9/00026* (2013.01)
USPC .......................................... 382/124; 382/115

(58) Field of Classification Search
CPC ............ G06K 9/0002; G06K 9/00013; G06K 9/00067; G06K 9/00087; G06K 2009/00006; G06K 9/00885; G06K 9/00375; G06F 21/32; G06F 21/30; A61B 5/1172; G07C 9/00158; G07C 2209/12; G06T 2207/30196; H04N 1/442
USPC ......................................... 382/100, 115, 124
See application file for complete search history.

(56) References Cited

U.S. PATENT DOCUMENTS 3,699,519 A   10/1972   Campbell 4,582,985 A   4/1986   Löfberg
(Continued)

FOREIGN PATENT DOCUMENTS

EP   0470530 B1   1/1997
EP   0813164 B1   3/2003
(Continued)

OTHER PUBLICATIONS

International Search Report received for PCT Patent Application No. PCT/SE2010/050809, mailed on Mar. 25, 2011, 5 pages.
(Continued)

*Primary Examiner* — Edward Park
(74) *Attorney, Agent, or Firm* — Scott A. Felder; Wiley Rein LLP

(57) ABSTRACT

The invention relates to a biometric device (1) for capturing fingerprint information and for extracting significant data from a partial fingerprint area, comprising processing means (8), a line sensor (2) for consecutively capturing fractional fingerprint images from fractional areas of a finger through a relative sliding movement between the finger and the line sensor, means for consecutively storing the fingerprint information in a first memory (6), decision-making means (3) for deciding when the information stored in the first memory constitutes a partial fingerprint area, extraction means (4) for extracting significant data from the partial fingerprint area stored in the first (7), where the captured fractional fingerprint images are stored in the first memory (6) in such a way that several consecutive fractional images are compared with the previously captured images, and are combined together to form a partial fingerprint area which is large enough for the extraction of the significant data, and where the oldest stored fingerprint image data is discarded from the first memory (6) when new fingerprint image data is stored in the first memory (6). In this way, it is possible to use a line sensor with a limited surface and still be able to reduce the memory requirements by extracting significant data representing the fingerprint.

13 Claims, 2 Drawing Sheets

(56) References Cited

U.S. PATENT DOCUMENTS

| | | | |
|---|---|---|---|
| 4,607,384 | A | 8/1986 | Brooks |
| 6,289,114 | B1 | 9/2001 | Mainguet |
| 2003/0123715 | A1* | 7/2003 | Uchida ............... 382/124 |
| 2004/0013288 | A1* | 1/2004 | Svensson et al. ....... 382/124 |
| 2005/0226479 | A1* | 10/2005 | Takahashi ............. 382/124 |
| 2005/0249386 | A1* | 11/2005 | Juh .................... 382/124 |
| 2005/0259852 | A1 | 11/2005 | Russo |
| 2007/0009141 | A1* | 1/2007 | Ikeda ................. 382/124 |
| 2007/0274575 | A1 | 11/2007 | Russo |
| 2007/0286465 | A1* | 12/2007 | Takahashi et al. ...... 382/125 |

FOREIGN PATENT DOCUMENTS

| | | | |
|---|---|---|---|
| EP | 1330185 | B2 * | 7/2003 |
| EP | 1420360 | A1 | 5/2004 |
| EP | 1150608 | B1 | 12/2004 |
| EP | 1317730 | B1 | 12/2005 |
| EP | 1330185 | B2 | 12/2007 |
| GB | 2310522 | A | 8/1997 |
| JP | 2004164170 | | 6/2004 |
| JP | 2005301746 | | 10/2005 |
| JP | 2006018754 | | 1/2006 |
| JP | 2009187429 | | 8/2009 |
| SE | 515239 | C2 | 7/2001 |
| WO | 01/87159 | A1 | 11/2001 |
| WO | 02/074168 | A1 | 9/2002 |

OTHER PUBLICATIONS

Extended European Search Report in Application No. 10854794.4 (mailed Feb. 28, 2014).

Japanese Office action (with English translation) for Japanese Patent No. 2013-519622 dated Dec. 17, 2013.

* cited by examiner

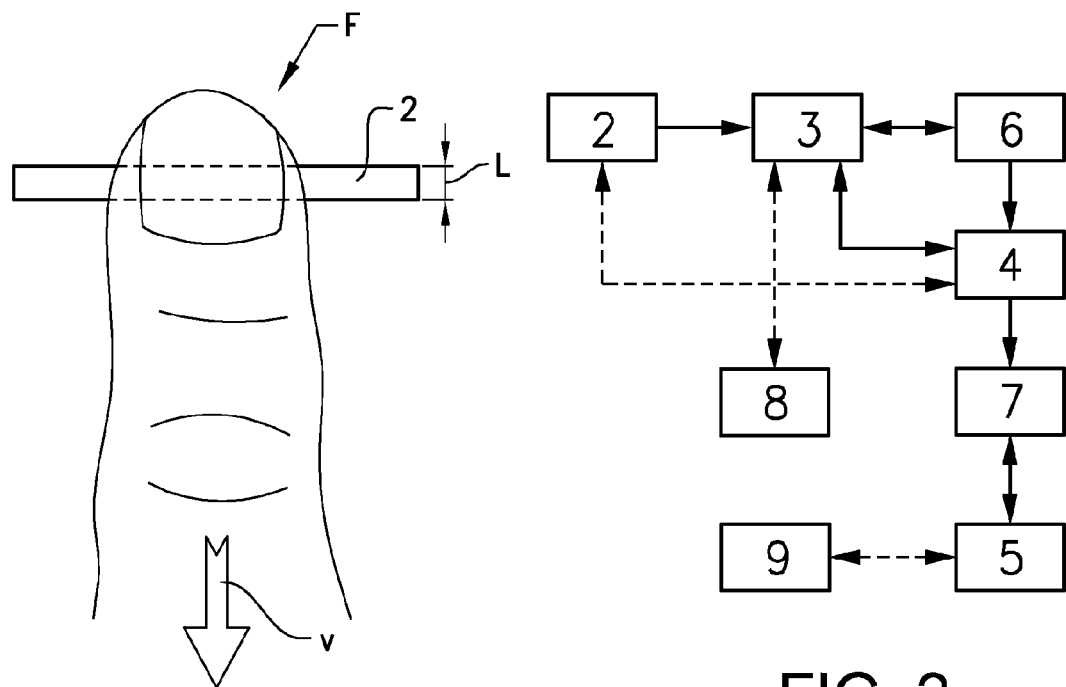
FIG. 1
FIG. 2
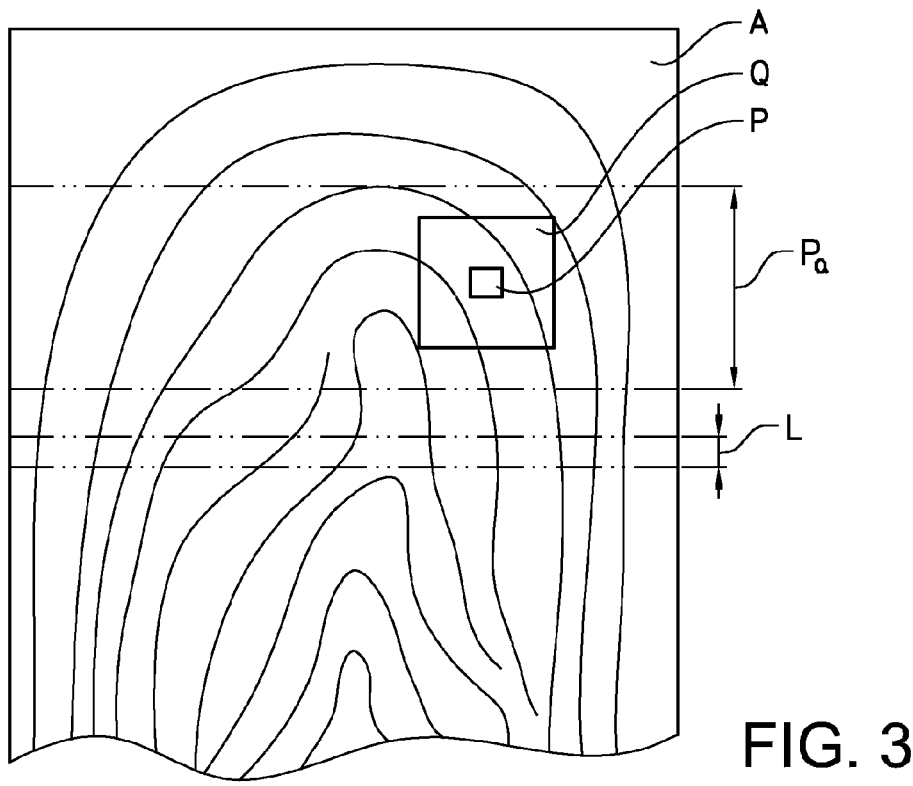
FIG. 3

BIOMETRIC VERIFICATION DEVICE AND METHOD

CROSS REFERENCE TO RELATED APPLICATION

This is a U.S. National Phase patent application of PCT/SE2010/050809, filed Jul. 12, 2010, which is hereby incorporated by reference in the present disclosure in its entirety.

TECHNICAL FIELD

The present invention relates to a device and a method for biometric enrolment or verification of an individual's identity by means of fingerprint information. By means of the invention, the memory requirement and fingerprint sensor size can be reduced compared to the prior art.

BACKGROUND ART

One way of simplifying the use of various types of appliances which are protected by, for example, passwords, access codes and the like, is to replace the codes with devices which recognize the user on the basis of different physical characteristics, so called biometry. One type of biometrical characteristic is fingerprint information, which can be used to test and either confirm or reject a user's attempt to gain access to an appliance, a premises, etc., referred to as user identity verification. Verification with the aid of fingerprint information is in most cases done by the user having stored his fingerprint information in the equipment in question in advance, by which means a template is created. The information for creating this template can either be input into the appliance which the user will later want to have access to, or via a central appliance.

When the user attempts to gain access to the equipment in question, a biometric device inputs information from the user's finger and compares the input information to the template in order to decide if the user is to be granted access to the equipment or not.

Equipment which verifies with the aid of fingerprint information must satisfy a number of requirements, for example reliability and speed. Verification in portable devices, for example mobile telephones, portable computers, different types of cards, etc., further requires that the equipment must be as small, lightweight and energy-efficient as possible. Another requirement is that the equipment should be as inexpensive as possible.

Known types of devices for verifying a user's identity with the aid of fingerprint information read information from a user's fingerprint and compare this with a template by means of the input information being combined into a representation of the fingerprint, which is then compared with the template which has been stored in advance. A disadvantage of such types of equipment is that they require a great deal of memory, on account of the representation of the fingerprint which is built up. This is also a drawback of known devices for registering said reference information. Memory is expensive, takes up space and requires a great deal of current, which means that known devices are relatively expensive and large. A large use of memory will also slow down the system.

Another parameter which affects cost and takes up space is the surface area of the sensor which is used to read the fingerprint information for the verification. This surface area can be reduced by using what is referred to as a line sensor, in other words a sensor which surface area is too small to read a complete fingerprint without the finger and the sensor moving relative to each other. During verification or registering with the aid of such a sensor, the finger is moved relative to the sensor, and the above-mentioned representation of the fingerprint is built up in a memory on the basis of consecutively input partial areas. Thus, line sensors satisfy the requirements regarding the size and cost of the actual sensor, but the requirement for memory remains. Using a line sensor, the equipment must be able to read information from a moving finger, as distinct from equipment which uses surface-area sensors, against which the finger is simply placed or held.

One example of prior art is SE 515 239, which deals with a method for assembling a composite image of a fingerprint, using a sequence of partial images. This document appears to deal exclusively with assembling an image of, for example, a fingerprint, and suffers from, inter alia, the abovementioned drawback of a large need for memory space.

EP 0813164 B1 discloses a system in which a fingerprint image is collected by relative sliding motion between a finger and the sensor. The sensor is in the form of a line sensor, i.e. a bar that is longer than a finger is wide, but is relatively narrow compared to the length. The sensor thus collects partial images of the fingerprint image and adds them together into a full image, which is stored in a memory. The image of the fingerprint is formed from a matrix of sensor elements.

EP 1317730 B1 discloses a method and a device for checking fingerprints. The method comprises the steps of recording in succession at least two digital images of finger areas and comparing each of the recording images with a reference image that represents at least one previously recorded reference fingerprint from a reference finger areas.

EP 0470530 B1 discloses a fingerprint verification method comprising the steps of performing partial density differentials on a corresponding fingerprint image with respect to two directions, determining a point as a centre of characteristics where an extreme value of a histogram of a corresponding partial differential value occurs in both directions and performing a fingerprint verification by use of the corresponding centre of characteristics.

EP 1150608 B1 discloses a system for checking fingerprints comprising a sensor which is adapted to record a fingerprint made by a fingertip. The surface of a sensor is so small that it can record merely a partial fingerprint. This partial fingerprint is compared with different parts of a complete, previously stored reference fingerprint to determine whether the partial fingerprint originates from the same person as the reference fingerprint.

GB 2310522 B discloses a fingerprint ID system, which compares input fingerprint image data with registered fingerprint image data, where minutiae bulge-line direction patterns and bulge-line curvature patterns are compared, and the matching degree between the fingerprint image data and the registered data is compared with two threshold values for judging if a fingerprint corresponds to registered data. When the matching degree is between the two thresholds, minutiae are compared successively in minutia high-density areas and minutia medium-density areas.

U.S. Pat. No. 3,699,519 A discloses a system in which a fingerprint is observed, a small portion at a time, using a flying spot scanner, whose spot travels along a predetermined path at each position to provide an electrical analogue signal indicative of the nature of the fingerprint at each position. The analogue signal is converted into digital form and temporarily stored in a memory having a plurality of storage elements. The signal stored in the memory is constantly circulated through each of the storage elements to provide for detection of minutiae (i.e. ridge endings, bifurcations, etc.) regardless of their angular orientation. Detecting the occurrence of specified minutia is achieved by sensing the states of selected ones of the storage elements.

U.S. Pat. No. 4,582,985 A discloses a data carrier which comprises an internal processor for processing supplied identification information of the owner during a card verification process, and for generating an acceptance signal as a result of a positive verification. The internal processor includes a verification device which comprises a sensor for sensing a fingertip of the owner and obtaining corresponding finger print line information. When a fingerprint is verified as valid, an acceptance signal is generated.

U.S. Pat. No. 4,607,384 A discloses an arrangement for generating a classification code for a fingerprint having a pattern of ridges, the ridges having a plurality of reference features, which includes overlaying the intersection of a pair of cross-hairs at a first one of the reference features. A line is overlaid from a second one of the reference features to the first reference feature. The cross-hairs are oriented so that the line bisects a quadrant of the cross-hairs. The ridges crossed by predetermined portions of the cross-hairs are counted to generate the classification code.

EP 1330185 B2 discloses a device for biometric verification of an individual's identity by means of fingerprint information, comprising controller and memory means, means for consecutively reading, and storing in said memory means, fingerprint information from partial areas of a finger, and means for extracting, and storing in said memory means, verification data from fingerprint information read from a partial area, means for verification processing of the extracted verification data, and decision-making means for deciding if fingerprint information from a new partial area has been read. At least those points in time when fingerprint information from a new partial area has been read are used by the controller means to update the contents of the memory means, said updating comprising removing fingerprint information from previously read partial areas, the controller means also updating the stored verification data on or before said points in time. In this device, the memory requirement for fingerprint verification is reduced when compared with a system using a full size sensor. The size of the sensor surface is also reduced when compared with a system using a full size sensor.

All of the devices and methods described above require a substantial amount of memory and/or a relatively large sensor surface. There is thus still room for an improved device and an improved method for biometric verification.

DISCLOSURE OF INVENTION

An object of the invention is therefore to provide an improved biometric verification device with a reduced line sensor surface size. A further object of the invention is to provide an improved biometric verification device which requires less memory. A further object of the invention is to provide a method for biometric verification that allows for a reduced memory requirement. A further object of the invention is to provide a method for biometric verification that allows for a reduced line sensor surface size.

The solution to this problem according to the invention is described in the characterizing part of claim 1 regarding the device and in claim 10 regarding the method. The other claims contain advantageous embodiments and further developments of the device and the method according to the invention.

With a biometric device for capturing fingerprint information and for extracting significant data from a partial fingerprint area, comprising processing means, a line sensor for consecutively capturing fractional fingerprint images from fractional areas of a finger through a relative sliding movement between the finger and the line sensor, means for consecutively storing the fingerprint information in a first memory, decision-making means for deciding when the information stored in the first memory constitutes a partial fingerprint area, extraction means for extracting significant data from the partial fingerprint area stored in the first memory and for storing the extracted significant data in a second memory, the object of the invention is achieved in that the captured fractional fingerprint images are stored in the first memory in such a way that several consecutive fractional images are compared with the previously captured images, and are combined together to form a partial fingerprint area which is large enough for the extraction of the significant data, and where the oldest stored fingerprint image data is discarded from the first memory when new fingerprint image data is stored in the first memory.

By this first embodiment of the biometric device according to the invention, a device is provided in which a line sensor of limited size, especially having a limited number of lines, is used to capture fractional fingerprint images which are assembled to partial fingerprint areas, and where the partial fingerprint areas are used for the extraction of significant data. In this way, the sensor size can be reduced at the same time as the memory requirements are reduced, which will save cost both for the sensor itself as well as for the memory. A cost-effective biometric device is thus provided.

In an advantageous further development of the biometric device according to the invention, the line sensor comprises less than ten lines. Preferably eight lines are comprised in the line sensor, since eight is a power of 2.

In the inventive method for capturing fingerprint information and for extracting significant data from a partial fingerprint area, the steps of consecutively capturing fractional fingerprint images from fractional areas of a finger through a relative sliding movement between the finger and the line sensor, consecutively storing the fingerprint information in a first memory, deciding when enough fractional areas are stored in the first memory to make up an assembled partial fingerprint area such that an extraction of significant data is to be preformed, extracting significant data from the assembled partial fingerprint area stored in the first memory, storing the extracted significant data in a second memory, comparing each fractional image with the previously captured fractional image, combining the fractional images to form a partial fingerprint which is large enough for the extraction of the significant data, and discarding the oldest stored fingerprint image data from the first memory when new fingerprint image data is stored in the first memory.

BRIEF DESCRIPTION OF DRAWINGS

The invention will be described in greater detail in the following, with reference to the embodiments that are shown in the attached drawings, in which FIG. 1 shows a schematic finger that is swept over a line sensor, FIG. 2 shows a schematic view of the device according to the invention, FIG. 3 shows a schematic view of a part of a fingerprint area.

MODES FOR CARRYING OUT THE INVENTION

Figure 4:
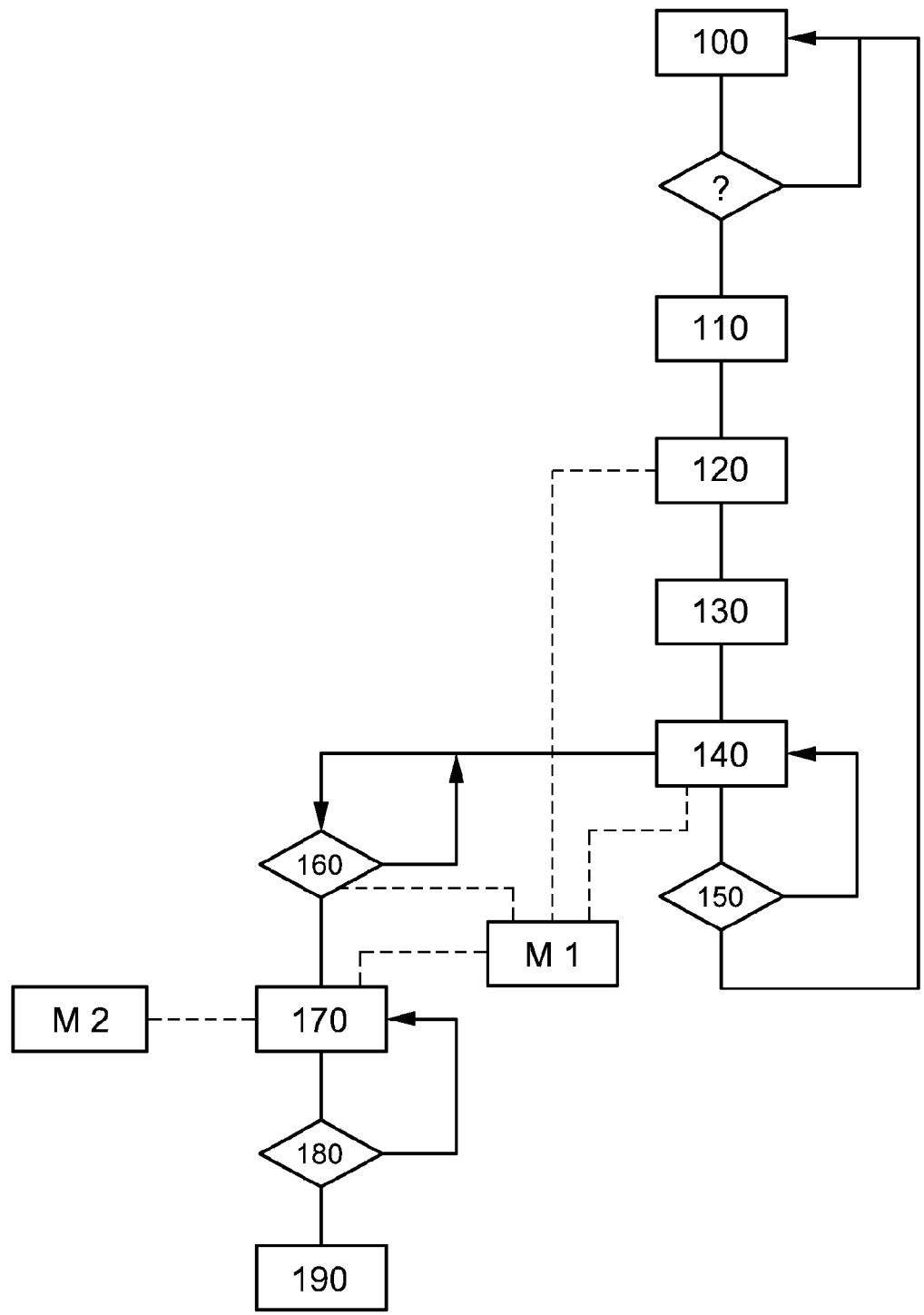
FIG. 4 shows a flow chart of the inventive method.

The embodiments of the invention with further developments described in the following are to be regarded only as examples and are in no way to limit the scope of the protection provided by the patent claims.

FIG. 1 shows, in a schematic view, a finger F which is placed against a sensor 2 which is used to read and register information from the finger with the aid of sensor elements located in or adjacent to the sensor surface area. The sensor is in this case what is referred to as a line sensor, in other words a sensor having a total sensor surface area L such that the finger and the sensor must be moved in relation to each other in order to input or read the entire fingerprint. This is usually done by the finger being moved at a speed v in a sliding movement across the line sensor.

The area L covered by the line sensor is rectangular and contains, by way of example, eight lines of sensor elements, so called pixels. The line sensor may of course also contain other numbers of lines, such as twelve, but in order to save silicon, the surface of the line sensor should be as small as possible. The line sensor comprised in the inventive device is too small to be able to read one partial fingerprint area that is large enough to allow an extraction of significant data from a single image. The width of the sensor may be chosen to cover the complete finger width or a part of the finger width. The sensor principle according to which the sensor elements work can be chosen largely arbitrarily, but, by way of example, mention may be made of optical sensors, capacitive sensors, heat sensors, and pressure sensors. Each pixel can read a value with a certain resolution, for example 8 bits, in other words the value which a pixel reads/generates can vary between 0 and 255. The physical size of a pixel element may e.g. be in the range of 10 to 100 μm in square, and is preferably in the range between 50 and 70 μm.

FIG. 2 shows a schematic view of the device according to the invention. The device comprises a line sensor 2 against which a finger is swept. Before the start of reading a fingerprint, the device is in a stand-by mode and the memories of the device are empty. At a specific first time, a first image is captured from the sensor, which contains a representation of the fractional area of the fingerprint that covers the line sensor at that specific time. The image is stored in a first memory 6 and may also be preserved in a buffer. In the shown example, the image contains eight lines of information obtained from the line sensor having eight lines of pixels. At a specific second time, a second image is captured.

The second image is compared with the image stored in the first memory, and the amount of new information is identified. The information in the second image is then added to the stored image, by for example only adding the new lines detected in the second image, or by merging the complete second image into the stored image using e.g. an averaging method. The memory will now contain information from both the first and the second image. A third image is captured and is compared with the image stored in the buffer, identifying the new information, and combining the third image with the stored image in the same manner as above. In this way, the image stored in the first memory will grow with each captured image. After a certain number of iterations, depending on e.g. the number of lines of the line sensor and the clock rate, an image corresponding to a partial fingerprint area will be assembled in the first memory. When the size of the partial fingerprint area is large enough for significant data extraction needed by an enrolment or verification algorithm, the stored image does not have to grow any more, and the data corresponding to the oldest image in the buffer can be discarded after the addition of new image data. This will keep the stored image data more or less constant after this point.

The way of determining the interval between the specific times for image capturing, i.e. the clock rate, can be done in different ways. One way is to simply use a clock with a predefined clock rate. Such a method may be relatively inflexible since it will capture images with the same time spacing regardless of the speed with which the finger is swept over the sensor. In this way, several images containing the same information may be captured, which does not affect the system as such but will require more energy. An external sensor may be used to determine the finger speed and this sensor can be used to control the clock rate of the clock.

It is also possible to let the controller means compare the images between two consecutively captured images and to assess the difference between the two images. This information can be used to decide the time interval to the next image capture. The system starts off with a high clock rate for the image capture, adapted to the highest allowed sweep speed for the finger, and is then adapted to the actual sweep speed of the finger. In this way, the system will not capture more images than necessary, which will reduce the required energy for the system.

Another possibility to determine the clock rate is to first use a few captured images only to detect the sweep speed of the finger and to use this information to set the clock rate for the capturing of the fingerprint. The memory is then erased and the actual capturing of the fingerprint is started.

Another way of saving energy is to let the image capture rate be adapted to the highest allowable finger speed. The images are in this case captured at a steady state. Each captured image is then compared to the previous image and if the difference between them is below a specific value, e.g. when the difference is less than four lines, the image is discarded and the next image will then be used. In this way, the number of storing operations of images in the memory is reduced.

The captured images are in this way added together in the memory to build up a partial fingerprint area. A partial fingerprint area is larger than a fractional fingerprint area. In some known biometric systems, line sensors that can read a complete partial fingerprint area are used. In such a case, the partial fingerprint area can be used directly to extract significant data. In the shown example, a partial fingerprint area may e.g. comprise 32 lines of information. Depending on the overlap between the captured images, at least five fractional fingerprint areas have to be captured in the described example in order to obtain a partial fingerprint area.

When the memory comprises a partial fingerprint area consisting of at least a predefined number of lines, i.e. 32 lines or more, significant data from a partial fingerprint area can be extracted from the stored image. The significant data preferably consists of one or more significant area or areas P, which can be used to characterize the fingerprint of a user. The significant area or areas are extracted from the partial fingerprint area with a method that singles out the significant area or areas from the rest of the partial fingerprint area, which at the same time reduces the memory requirement for storing the significant data. When an extraction of significant data is ready, the significant data in the form of one or more significant area or areas are stored in a second memory and the superfluous data is discarded. At the same time, the oldest part of the partial fingerprint area used for the extraction of significant data may be removed from the first memory, when new data is added to the memory. At least a few lines of information need to be saved in order to be able to add new lines of information from the captured fractional images. It is of advantage to let the first memory be implemented as a circular buffer that is somewhat larger than a partial fingerprint area required for an extraction of significant data. It is also possible to let the first memory shift out the earliest data information when a stacked memory is used, or to overwrite used data information the when new data is stored in a circular buffer. In this way, there will always be a partial fingerprint area that can be extracted from the memory together with sufficient place to insert new captured images at the same time. It is preferred to use the data of the partial fingerprint area directly from the first memory, but it is also possible to move it to another buffer before the significant data is extracted.

The time intervals between the extractions of significant data can be chosen freely. It is however advantageous to use the information in a partial fingerprint area for more than one extraction operation. An extraction may e.g. be performed after the addition of a specific new number of pixel lines to the partial fingerprint area. In one example, an extraction is performed after 8 pixel lines have been added to the partial fingerprint area. In this way, some of the information in a partial fingerprint area will be used in 4 extraction operations. Other spacing between the extraction intervals is also possible, and is preferably between a half and a quarter of a partial fingerprint area. In a previously known method where the complete partial fingerprint area is captured with a single reading operation, the significant data is extracted from that area and the area is later discarded, except from a border line used for alignment of the images, and a new partial fingerprint area is captured. In such a method, the border areas are not used for the extraction operation. With the inventive method, the complete fingerprint area can be used to extract significant data. The inventive method thus provides a sliding window that allows all the fingerprint information to be used for extracting significant data. This will improve the resolution of the system and will also improve the accuracy in extracting significant information. This in turn may reduce the size of the stored significant data, since it is possible to reduce the number of significant areas with a maintained accuracy for verification or registering.

It is important that the captured image overlaps the previously captured image. In this way, it is possible to detect which part of the captured image that is to be added to the stored partial fingerprint area in the memory. An overlap of one to two lines is preferred, even if a greater overlap is also possible. Since the line sensor used is very limited in size, only a fractional area of a fingerprint can be captured at a time. Several fractional images are assembled to form a partial fingerprint area. A partial fingerprint area contains enough information for the extracting means 230 to be able to extract significant data from the partial fingerprint area.

FIG. 2 shows a schematic view of the device according to the invention and of how information is handled and data is extracted in a device according to the invention. The term "extracted data" here refers to reference data in the case of registering, and verification data in the case of verification. Included in a device 1 according to the invention is a line sensor 2 for consecutively reading fingerprint information from fractional areas of a finger, and means 4 for extracting certain significant data from the information read and, as well as means for control and computing comprising processor means 8 and first memory means 6. The extraction and further processing will be described in detail below. The device moreover comprises a decision-making means 3.

The reading of fingerprint information with the aid of a line sensor 2 involves fractional areas of the finger being read by the sensor in connection with the movement of the finger. The fractional areas preferably consist of the section of the finger which is covering the line sensor surface area at the time of image capture. The extraction in the extraction means 4 is suitably, but not necessarily, initiated when several fractional areas has been read by the sensor 2 and subsequently has been added together to form a partial fingerprint area.

The functions of the decision-making means 3 include deciding whether enough fractional fingerprint areas has been captured to form a partial fingerprint area in order to allow for an extraction of fingerprint data by the extraction means 4. The significant data extracted from a partial fingerprint area which has been assembled from a plurality of captured fractional images is stored in the second memory 7. According to the invention, at least part of the fingerprint information stored in the first memory 6 can be removed when new data is stored in the first memory.

The decision-making means 3 can preferably include a first memory 6, for example a RAM, in which captured fractional image data is stored. When a new partial fingerprint area has been assembled, the extraction means 4 can start working on these data. The extraction means also preferably comprise a second memory 7, for example once again a RAM, to which the new partial fingerprint area can be copied. The device 1 will also include a means 8 for control and computing, for example a processor, a CPU. When the decision-making means has decided that enough fractional image data has been captured and has been assembled into a new partial fingerprint area for an extraction to take place, the extraction process is started by the extraction means after the assembled partial fingerprint area is transferred to the extraction means from the decision-making means. The decision-making means continues to ascertain whether a new partial fingerprint area has been assembled.

In another example of the invention, the fractional fingerprint images are not immediately combined into a partial image. Instead, all or a certain number of the captured fractional fingerprint areas are stored consecutively, i.e. compared with each other, but not assembled, in a memory such that information from the total fingerprint area is located in the memory after completion of the finger sweep. The extraction of significant data as described above can then be processed off-line, at a later stage. This is advantageous in that the processor capacity of the device can be much lower, as compared with the method above, which must be performed in real time in order to save memory. The drawback of off-line processing is that the memory requirements are higher. However, by using the comparison data between consecutive fractional images, duplicate images can be eliminated, and substantial memory space can still be saved. The extraction of significant data can then be performed on the total fingerprint area divided into partial fingerprint areas as usual.

The significant data can be used both as verification data or reference data. Reference data is data stored the first time a user sweeps his or hers finger over the sensor. The reference data is stored in an external memory of the security system and is used as reference to compare a newly read fingerprint. When reading reference data, the data is stored in the external memory. When reading verification data, the verification data is only compared with the reference data stored in the system. If the two data sets match, the user's identity is confirmed and the verification data is discarded.

According to one method which can be used with the present invention, a certain number of significant areas P can be extracted from the total area of the fingerprint of a user. One type of significant data which can be used is explained below, but other types of significant data can also be used within the scope of the invention, for example representation for pattern recognition or so-called minutiae.

The device may further comprise further processing means 5 adapted to handle the significant data extracted by the extraction means. The further processing means can either include the registering and storing of significant data, which will be used in later verification of a user's identity, or may consist of the actual verification. Both registering and verification with the aid of a device according to the invention will be explained below. The further processing means 5 will in this case compare the significant data stored in the second memory 7 with previously stored significant data, stored e.g. in a third memory 9 which may be internal or external.

In registration with the aid of a device according to the invention, certain significant data, reference data, are to be extracted so that they can later be used for verification. According to one method which can be used with the present invention, a certain number of significant areas P can be extracted from the total fingerprint area A. One type of significant data which can be used is explained below, but other types of significant data can also be used within the scope of the invention, for example representation of pattern recognition or so-called minutiae. FIG. 3 shows a schematic view of the areas used.

The significant areas P are preferably all of the same size and shape; in the example used here, they are rectangular. In order to extract significant areas P from the assembled partial fingerprint area Pa, a surrounding area Q is used which is smaller than the partial fingerprint area but larger than the significant areas P. The surrounding area Q is preferably also rectangular. L is the sensor area which reads the fractional images.

The partial fingerprint area Pa is regarded as constituting a cartesian system of coordinates, and the surrounding area Q is initially placed at a certain position in the system of coordinates Pa, preferably at the upper left corner of the system of coordinates. In the procedure which is carried out, the surrounding area Q is thereafter moved in steps within the partial fingerprint area Pa, preferably one pixel at a time on the first axis and with the coordinate on the second axis maintained, thereafter with the coordinate on the first axis extended by a certain step, preferably one pixel, after which Q with the new coordinate on the first axis is moved one pixel at a time on the second axis, which procedure is repeated until the desired part of the partial fingerprint area Pa is covered, or until the desired number of significant areas P have been found in the partial fingerprint area.

The surrounding area Q can also be regarded as a movable system of coordinates within the system of coordinates Pa, with the origin at the point (x, y) in Pa. The movement made by Q can then be seen as movements within Pa from the origin for Q, in other words movements of x and y.

For each combination of the values of x and y (in other words for each position for the origin of Q), a check is made to determine whether the enclosed areas with the predetermined size of P are unique areas and are therefore to be stored in a table which can form a basis for later verification. The condition which determines that an area with the predetermined size is to be considered as a significant area P is that, within the surrounding area Q, it differs from all other areas of corresponding predetermined size according to certain predetermined conditions which can be varied in a large number of ways. The exact criteria determining when an enclosed area is to be considered as unique in its surroundings can be varied in a number of ways and will therefore not be described in detail here.

When the registration process described above has been carried out for a certain number of enclosed areas, the table will contain the number of significant areas P. If the number of significant areas found is below a predefined number, the registration may have been unsuccessful. The table which has been obtained in the registration procedure must contain information for each significant area P or for at least a predetermined number of significant areas P for later use in verification.

When a user has registered himself in accordance with the procedure described above, the information which has been stored in the table can be used at a later stage to verify the user's identity, for example by means of the above-described type of sensor, in other words a line sensor, that is to say it can be used to decide if the user is to be allowed access to certain equipment, a building or the like. In this case, the means for further processing thus becomes a verification means.

According to the prior art, for the purpose of further processing, for example verification, the data read by the line sensor would be stored and put together to form an image or other representation of a large part of the fingerprint.

However, this would require a great deal of memory and would entail costs and make the verification equipment relatively large. The present invention offers a solution which permits verification of a user's fingerprint without the need for large quantities of memory circuits, as will be explained below.

The actual device and method used for the verification can be varied within the scope of the invention, but one possible device and method is described below. The major components and steps of reading the information and extracting data are suitably substantially similar to those described above in connection with the registration, and will for that reason not be described again here.

The verification can be carried out, for example, using a table which has been created in an earlier registration, preferably according to the procedure which has been described above, said table including verification data, i.e. significant data from a number of distinct areas of the user's finger.

The role of the verification means is therefore to ascertain whether an assembled partial fingerprint area contains, with acceptable accuracy, the same significant areas as is stored in the table, which procedure is repeated for all significant areas. Data from the assembled partial fingerprint area which is first extracted by the extraction means are transferred directly to the verification means, which examines whether this significant area is identical to one of the significant areas stored in the template. For subsequent assembled partial fingerprint areas, the decision-making means will have the same function as has been described previously in connection with the registration, in other words the decision-making means is used to control when the extraction means is to start working with a new assembled partial fingerprint area.

When a check is to be made to determine if an assembled partial fingerprint area comprises a significant area that is identical to one of several of the stored significant areas, this is done by examining whether the significant data available in the table have an acceptable likeness to a corresponding significant area extracted from the assembled partial fingerprint area.

If the significant area extracted from the assembled partial fingerprint area is not identical or close to identical to any of the significant areas in the stored table, the verification of this significant area is deemed to have been unsuccessful. If too many or all of the significant areas from the assembled partial fingerprint areas differ from the stored significant areas, the verification of the user's identity is deemed to have been unsuccessful. If all or a most of the significant areas are identical or close to identical to the significant areas from the assembled partial fingerprint area, the verification is deemed to have been successful.

When the presence of a certain significant area is considered to have been verified, it is possible to use the knowledge of which significant area it was when verifying the significant area extracted from the assembled partial fingerprint area which is assembled thereafter. For example, if the significant area extracted from the assembled partial fingerprint area which has been assembled first is verified such that it is considered to correspond to significant area number one in the template, it may be sufficient to examine the next significant area to see if it is significant area number two in the template, and so on. This can be done in many different ways, and the one which is chosen is not of crucial importance to the invention.

In an alternative of the verification which has been discussed above, it is possible to extract significant data, for example the significant areas according to the above, from the assembled partial fingerprint areas and store these data in a table in order, at a later stage, to compare data in this table with the data which have been saved from the registration.

The invention is not limited to the embodiments described above and can instead be varied freely within the scope of the attached patent claims.

The physical division of the means included in the device can of course be made in a large number of ways which are all in principle acceptable. As is shown in FIG. 2, the reading means and the decision-making means can be separate physical units and the extraction means can form one unit together with the means for further processing, or each means can be a separate physical unit. All combinations of physical and functional units are in principle conceivable within the scope of the invention.

The inventive method for capturing fingerprint information and for extracting significant data from a partial fingerprint area, shown as a flow chart in FIG. 4, comprises the steps of consecutively capturing fractional fingerprint images from fractional areas of a finger through a relative sliding movement between the finger and the line sensor, consecutively storing the fingerprint information in a first memory, deciding when enough fractional areas are stored in the first memory to make up an assembled partial fingerprint area such that an extraction of significant data is to be performed, extracting significant data from the assembled partial fingerprint area stored in the first memory, storing the extracted significant data in a second memory, comparing each fractional image with the previously captured fractional image, and combining the fractional images to form a partial fingerprint which is large enough for the extraction of the significant data, and discarding the oldest stored fingerprint image data from the first memory when new fingerprint image data is stored in the first memory.

In step 100, the device is in a standby state. The device detects when a finger is placed on the line sensor. In step 110, a first fractional fingerprint image of a fractional area of a finger is captured through a relative sliding movement between the finger and the line sensor. The fractional fingerprint image comprises a very limited number of lines, in the range of six to twelve lines, since the line sensor used is held small to save silicon area.

In step 120, the first captured fractional fingerprint area is stored in a first memory, M 1. In step 130, a further fractional fingerprint image of a fractional area of the finger is captured. In step 140, the further fractional fingerprint image is compared with the previously captured fractional fingerprint image. The fractional fingerprint data is combined and stored in the first memory to form a partial fingerprint area which is large enough for the extraction of the significant data. This step is repeated until the complete fingerprint of the finger is read. In step 150, it is checked if there is still a finger resting on the line sensor. If not, the capture and processing of images stops and the device returns to the standby state 100. If the finger is present but not moving on the sensor, the significant data extraction process is halted. To detect if a finger is moving or not, the previous image is compared with the captured image. If there is no difference in the images for a specific time, it is assumed that there is no finger motion, but the image capture process continues until motion is detected, at which time the extraction of significant data is resumed. If the finger leaves the surface, the process is stopped and the device returns to the standby state 100.

In step 160, the content in the first memory is checked. When the amount of lines in the first memory is above a predefined number, i.e. when the image stored in the first memory corresponds to a partial fingerprint area and is large enough for the extraction of the significant data, the image will be used to extract significant data from the partial fingerprint area. At the same time, the oldest stored fingerprint image data is discarded from the first memory when new fingerprint image data is stored in the first memory. The pointer may also be set back in the first memory, such that the next storage of a fractional fingerprint area is possible. The extraction of significant data is done in step 170. The extracted significant data is stored in a second memory M 2.

In step 180, it is checked if there are any more partial fingerprint areas stored in the first memory. When there are no more images in the first memory, and step 150 has detected that the finger is finished or has stopped, the extraction is aborted in step 190.

The significant, extracted data stored in the second memory comprises information that can be used to identify a user by his or hers fingerprint. The significant data can be stored as a reference value, or can be compared to a stored reference value in a verification process.

The invention is not to be regarded as being limited to the embodiments described above, a number of additional variants and modifications being possible within the scope of the subsequent patent claims.

REFERENCE SIGNS

1: Device
2: Line sensor
3: Decision-making means
4: Extraction means
5: Further processing means
6: First memory
7: Second memory
8: Processing means
9: Previously stored significant data
A: Fingerprint area
L: Line sensor area
P: Significant area
Pa: Partial fingerprint area
Q: Surrounding area

The invention claimed is:

1. Biometric device for capturing fingerprint information and for extracting significant data from a partial fingerprint area, comprising,
  a line sensor for consecutively capturing fractional fingerprint images from fractional areas of a finger through a relative sliding movement between the finger and the line sensor,
  a first memory configured to consecutively store the fingerprint information from the fractional fingerprint images,
  a decision-making processor configured to decide when the information stored in the first memory constitutes a partial fingerprint area which is large enough for the extraction of the significant data,
an extraction processor configured to extract significant data from the partial fingerprint area stored in the first memory,
a second memory configured to store the extracted significant data, and
a storage-determining processor configured to control the storage of the captured fractional fingerprint images in the first memory by comparing the several consecutive fractional fingerprint images with the previously captured fractional fingerprint images, combining the fractional fingerprint images together to form a partial fingerprint area which is large enough for the extraction of the significant data, and discarding the oldest stored fractional fingerprint image from the first memory when a new fractional fingerprint image is stored in the first memory,
wherein the partial fingerprint area comprises at least 32 lines of information, and
wherein the extraction processor is configured to extract the significant data from the partial fingerprint area stored in the first memory according to an extraction interval of between one-half and one-quarter of the partial fingerprint area.

2. Biometric device according to claim 1, wherein a partial fingerprint area comprises information from at least two fractional fingerprint images.

3. Biometric device according to claim 1, wherein a partial fingerprint area comprises information from at least five fractional fingerprint images.

4. Biometric device according to claim 1, wherein the line sensor comprises less than 20 lines.

5. Biometric device according to claim 1, wherein the line sensor comprises less than ten lines.

6. Biometric device according to claim 1, wherein the partial fingerprint area comprises less than 40 lines.

7. Biometric device according to claim 1, further comprising a comparison processor configured to compare the significant data stored in the second memory with a previously stored reference value representing the fingerprint of a user.

8. Biometric device according to claim 1, wherein the captured fractional fingerprint images are rectangular, and wherein a new fractional fingerprint image has, at one of its edges, a predetermined overlap with the previously captured fractional fingerprint image.

9. Biometric device according to claim 1, wherein the extracted significant data is compared to previously extracted figures.

10. Biometric device according to claim 1, wherein the decision-making processor, the extraction processor, and the storage-determining processor are a single processor.

11. Biometric device according to claim 1, wherein the decision-making processor, the extraction processor, and the storage-determining processor are each a separate processor.

12. Method for capturing fingerprint information and for extracting significant data from a partial fingerprint area, comprising the steps of:
consecutively capturing fractional fingerprint images from fractional areas of a finger through a relative sliding movement between the finger and the line sensor;
consecutively storing the fingerprint information from the fractional fingerprint images in a first memory,
deciding when enough fractional fingerprint images are stored in the first memory to make up an assembled partial fingerprint area which is large enough for the extraction of the significant data such that an extraction of significant data is to be performed,
extracting significant data from the assembled partial fingerprint area stored in the first memory, wherein the significant data is extracted from the assembled partial fingerprint area stored in the first memory according to an extraction interval of between one-half and one-quarter of the assembled partial fingerprint area,
storing the extracted significant data in a second memory, wherein the method further comprises the steps of:
comparing each fractional fingerprint image with the previously captured fractional fingerprint images,
combining the fractional fingerprint images to form a partial fingerprint area which is large enough for the extraction of the significant data, the partial fingerprint area comprising at least 32 lines of information,
discarding the oldest stored fractional fingerprint image from the first memory when a new fractional fingerprint image is stored in the first memory.

13. Method according to claim 12, in which the captured fractional fingerprint images are rectangular, and wherein a new fractional fingerprint image has, at one of its edges, a predetermined overlap with the previously captured fractional fingerprint image.

* * * * *